May 25, 1965  C. M. CUNNINGHAM ETAL  3,184,844
CHEESE DISPENSING APPARATUS
Filed Feb. 19, 1962  2 Sheets-Sheet 1

CHARLES M. CUNNINGHAM
MAURICE B. McCADAM
INVENTORS

BY Lyon & Lyon
ATTORNEYS

May 25, 1965
C. M. CUNNINGHAM ETAL
3,184,844
CHEESE DISPENSING APPARATUS
Filed Feb. 19, 1962
2 Sheets-Sheet 2
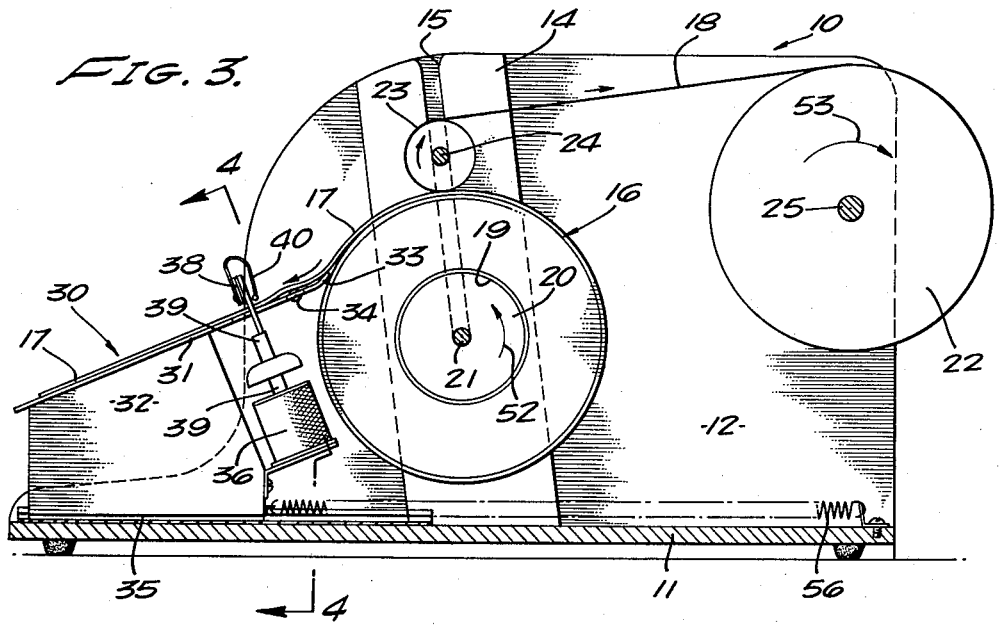
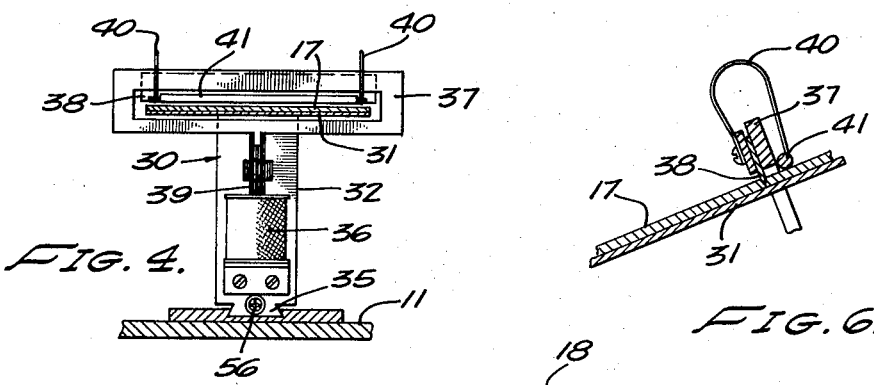
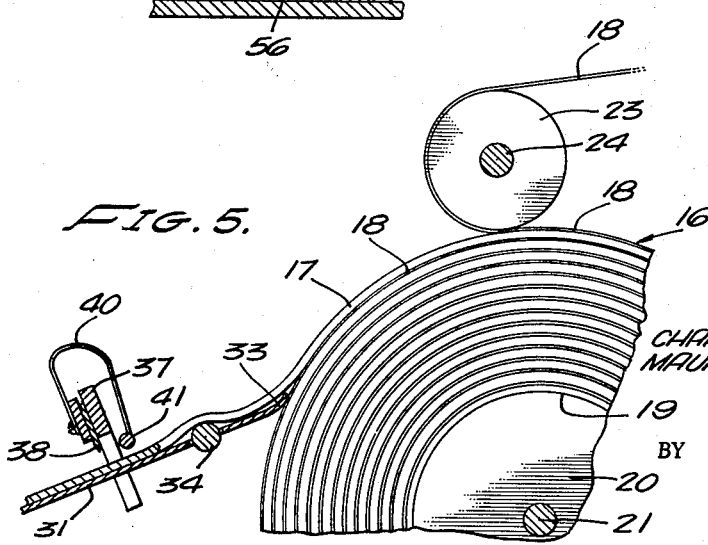
CHARLES M. CUNNINGHAM
MAURICE B. McCADAM
INVENTORS
BY Lyon & Lyon
ATTORNEYS

United States Patent Office 3,184,844
Patented May 25, 1965

3,184,844
CHEESE DISPENSING APPARATUS
Charles M. Cunningham, 7332 Donna Ave., Reseda, Calif., and Maurice B. McCadam, Van Nuys, Calif.; said McCadam assignor of five percent to William H. Mahr, Los Angeles, Calif.
Filed Feb. 19, 1962, Ser. No. 174,091
9 Claims. (Cl. 31—5)

This invention relates to an apparatus for dispensing slices of cheese and is particularly directed to an apparatus for dispensing slices of cheese from a roll of separated layers of cheese.

There has been an increasing use of so-called "sliced" natural and processed cheese. It has been conventional to package sliced cheese in plastic film or the like for convenient use of the individual slices. However, it has been found that after the package has been opened, it is necessary to carefully rewrap the unused slices and promptly refrigerate in order to prevent the drying out or spoiling of the unused slices. In the copending application of Maurice B. McCadam, entitled "Packaged Cheese" filed December 5, 1961, Serial No. 157,065, is disclosed a package of cheese from which individual slices or flat pieces of cheese may be progressively removed for use without disturbing the sealed packaging of the remaining cheese in the package. As described in said copending application, the individual slices or slice-shaped pieces of cheese (or a continuous length of cheese of desired "sliced" thickness) are placed on a continuous web of material such as plastic film or cellophane which is then rolled into a roll. The web of plastic film or cellophane separates each layer of cheese and covers both sides of each layer to prevent exposure to air which can cause dehydrating or spoiling of the cheese. Individual slices or lengths of cheese of sliced thickness are easily removed by separating the outer layer of web and cheese from the roll to expose the amount of cheese desired.

Although this manner of packaging cheese has been found extremely successful for maintaining the freshness of the cheese throughout the entire roll of cheese even though the cheese is intermittently used from the roll over an extended period of time, there are certain situations where it is desirable to rapidly remove one or more slices of cheese from the roll without requiring manual manipulation of the roll to separate the slices from the roll. For example, in restaurants and the like, slices of cheese are used on various types of sandwiches and in various dishes. Since cheese that is packaged in the manner described in the aforementioned application is protected from dehydrating and spoiling for extended periods of time and since the rate of use of sliced cheese by restaurants is relatively high, it is possible and practical to have a roll of cheese located on the work table where the cook or chef uses the cheese. This eliminates the need for numerous trips to the refrigerator for cheese as has been the conventional practice. It has been found that a cook or chef uses one or a few slices of cheese at one time and thus it is necessary to manually manipulate the roll of cheese each time a slice or slices of cheese is needed in order to remove such slice or slices from the outer convolution of the roll. Further, when the roll of cheese consists of a continuous length of cheese of the proper thickness and width for slices but is not predivided into individual slices, the chef or cook must unroll a portion of cheese and the sealing web and then cut off the desired length of cheese to constitute the individual slice of cheese that is needed. Although this type of roll of cheese minimizes the number of trips to the refrigerator for fresh cheese, the manual removal of slices from the roll has been found to be a time consuming operation when the number of slices of cheese which are used by restaurants and the like is considered.

Accordingly, an object of this invention is to provide a novel dispensing apparatus for dispensing cheese in slice form.

A further object of this invention is to provide a novel form of sliced cheese dispensing apparatus for use with a roll of cheese which may readily be actuated to automatically dispense one or more individual slices of cheese from the roll.

Another object of this invention is to provide a sliced cheese dispensing apparatus for use with a roll of cheese incorporating a continuous cheese-separating web, wherein the outer convolution of the web is peeled off the roll to rotate the roll of cheese and to permit the outer convolution of cheese to be separated and dispensed.

Another object of this invention is to provide an apparatus for automatically dispensing individual slices of cheese from a roll of a continuous length of cheese incorporating a continuous web separating the layers of cheese on the roll, wherein the web is withdrawn from the exterior of the roll of cheese to rotate the roll for separating the outer layer of cheese from the roll, and wherein a portion of the layer of cheese so separated is severed from the roll to form the desired cheese slice. Still another object of this invention is to provide such an apparatus in which appropriate controls are provided whereby the manual actuation of a single switch causes a proper amount of web to be withdrawn from the cheese roll to thereby position a piece of cheese of predetermined length to be severed from the roll, forming an individual slice.

Other objects and advantages of this invention, it is believed, will be readily apparent from the following detailed description of the preferred embodiments of this invention when read in connection with the accompanying drawings.

In the drawings:

FIGURE 3 is a sectional elevation view taken substantially on the line 3—3 as shown in FIGURE 1.

FIGURE 4 is a fragmentary sectional view taken substantially on the line 4—4 as shown in FIGURE 3.

FIGURE 5 is an enlarged view of a portion of FIGURE 3 illustrating the manner in which the web and cheese are separated from the roll.

FIGURE 6 is a fragmentary view of a portion of FIGURE 5 illustrating a different position of the apparatus for severing the cheese from the roll.

Figure 1:
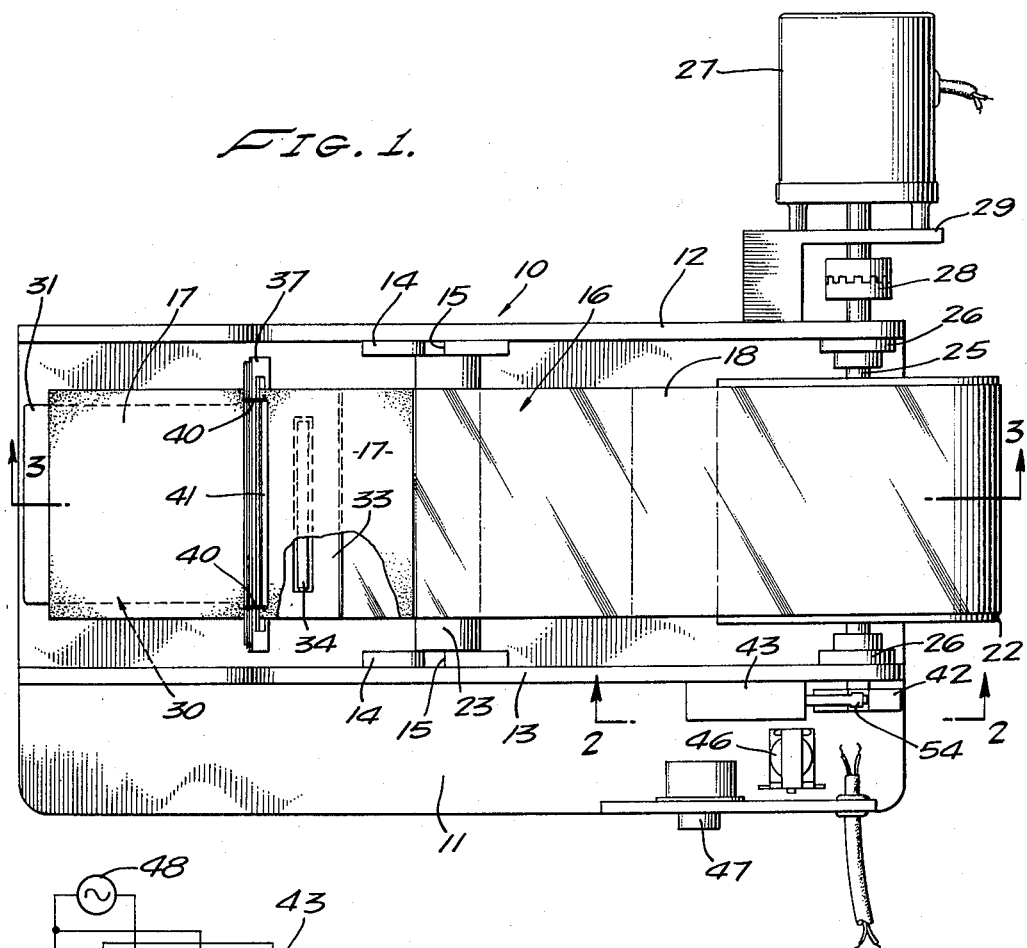
FIGURE 1 is a plan view of the novel dispensing apparatus of this invention.

Referring now to the drawings, the cheese dispensing apparatus of this invention, generally designated 10, includes a frame having a generally horizontal base member 11 and a pair of relatively vertical and parallel side members 12 and 13 mounted on the base member 11 in spaced relationship. A support plate 14 is mounted on the inside of each of the side members 12 and 13 and is provided with a groove 15. Each of the grooves 15 is positioned at a slight angle to the base member 11, as best shown in FIGURE 3, and extends from the upper end of the support plate 14 to a location substantially above the base member 11.

As described in the above-mentioned copending patent application of Maurice B. McCadam, the package of cheese, generally designated 16, of that invention is comprised of individual slices of cheese or a continuous length of cheese 17 supported on a continuous web 18 of cellophane or the like which is rolled on a core 19 to form the roll of cheese. As described in the aforementioned copending patent application and as illustrated in FIGURE 5 of this application, each layer of cheese 17 is separated from the next layer of cheese by a layer of web 18. A spool 20 is provided with the apparatus of this invention which is adapted to be inserted into and engage the core 19 for supporting the cheese package 16.

In order to rotatably support the cheese package 16 between the side members 12 and 13, the spool 20 is provided with a shaft 21 adapted to extend between the side members 12 and 13 and be received in the groove 15. Each end of the shaft 21 is supported by the lower end of each groove 15 so that the spool 20 and package 16 may be readily installed or removed by merely lowering or raising, respectively, the shaft 21 in the grooves 15.

Means are provided for withdrawing the web 18 from the exterior surface of the package 16 and for rotating the package 16 and, as shown in the drawings, these means may include a drum 22 and a follower roll 23. The follower roll 23 has a shaft 24 having ends adapted to be received in the grooves 15 for permitting rotation and upward and downward movement of the follower roll 23 but preventing lateral movement of the roll. The drum 22 is provided with a central shaft 25 rotatably supported in bearings 26 mounted on the side members 12 and 13 and is rotated by an electric motor 27 through a gear reduction integrally provided with the motor and through a clutch 28 as hereinafter described. The motor 27 is mounted to side member 12 by means of a bracket 29. The clutch 28 may be manually disengaged to permit manual turning of drum 22 for removing the web 18 from the drum when a complete package 16 of cheese has been dispensed.

Means are provided for separating the outer layer of cheese 17 from the cheese package 16 as the cheese package is rotated and, as shown in the drawings, these means may include the pallet assembly, generally designated 30. The pallet assembly 30 is provided with a pallet 31 mounted on a frame 32. The pallet 31 has an end 33 which is slightly upturned for engaging the outer surface of the web 18 for separating the outer layer of cheese 17 from the cheese package 16 as the package is rotated toward the upturned end 33 of the pallet 31 as best shown in FIGURE 5. A roller 34 is rotatably supported in a slot in the pallet 31 near the end 33. The roller 34 is positioned so that its outer cylindrical surface protrudes above the upper surface of the pallet 31. The roller 34 serves to separate the cheese 17 from the upper surface of the pallet 31 in order to prevent the cheese from adhering to the surface of the pallet which would prevent the progressive movement of the cheese down the pallet 31. Additional rollers similar to roller 34 may be provided and similarly mounted in the pallet 31 at locations along the pallet to further inhibit the adhering of the cheese to the surface of the pallet. Also, the surface of pallet 31 may be provided with grooves extending in the direction of the movement of the cheese to further inhibit the adhering of the cheese to the pallet.

The frame 32 is slidably mounted on the base member 11 for movement toward and away from the cheese package 16 by any convenient means such as the mating dovetail connection 35. A tension spring 56 extends from the frame 32 to the base member 11 for resiliently urging the end 33 of the pallet 31 into continuous contact with the cheese package 16.

Means are provided for severing a slice of cheese of appropriate length from the continuous length of cheese being separated from the package 16 and, as shown in the drawings, these means may include a solenoid 36, a knife holder 37, a knife blade 38. The solenoid 36 is mounted on the frame 32 in a manner whereby the plunger 39 of the solenoid 36 moves in a direction relatively perpendicular to the surface of the pallet 31 upon excitation of the solenoid 36. The knife holder 37 is mounted on the plunger 39 and is in the form of a rectangular frame which encircles the pallet 31. The knife blade 38 is mounted in the knife holder 37 and may be removed for sharpening or replacement. A hold-down roll 41 is provided and is resiliently supported in the knife holder 37 by means of a pair of spring wires 40 which normally maintain the roll 41 in the position shown in FIGURE 5. When the coil of the solenoid 36 is not energized, the knife holder 37, knife blade 38, and hold-down roll 41 are in their respective positions shown in FIGURE 5 so that the cheese 17 may pass through the knife holder 37 between the hold-down roll 41 and the pallet 31. When the coil of the solenoid 36 is energized the plunger 39 is pulled downwardly to in turn pull the knife holder 37 downwardly for resiliently urging the roll 41 against the cheese and for urging the knife blade 38 through the cheese 17 as shown in FIGURE 6. Since the hold-down roll 41 is resiliently supported by spring wires 40 below the cutting edge of the knife blade 38, the knife blade will be forced through the cheese and withdraw while the cheese is held against the pallet by roll 41. Thus, the slice of cheese is cleanly severed from the continuous length of cheese and the cheese will not objectionably adhere to the knife blade 38.

In order to operate the apparatus 10 for dispensing individual slices of cheese, the cheese roll or package 16 must be positioned in the apparatus 10. With the follower roll 23 removed from the apparatus 10 and the pallet 30 positioned as far to the left (as viewed in FIGURES 1 and 3) as possible by releasing the tension spring 36, the cheese roll of package 16 is positioned on the spool 20 and lowered between the side members 12 and 13 with the shaft 21 positioned in the grooves 15, as heretofore described. The follower roll 23 is then installed and rests on top of the cheese package 16. The outer convolution of web 18 is peeled off of the package 16, wrapped around the follower roll 23, as shown, and secured to the drum 22 by any convenient means such as by applying length of adhesive tape. The spring 36 is then attached as shown in FIGURE 3 to urge the pallet assembly 30 toward the package 16. The clutch 28 is disengaged and the drum 22 is manually rotated in the direction of arrow 53 until the end 33 of the pallet 31 engages and separates the outermost convolution of cheese from the package 16. The clutch 28 is re-engaged and apparatus 10 is then ready to automatically dispense individual slices of cheese as will be described.

Figure 2:
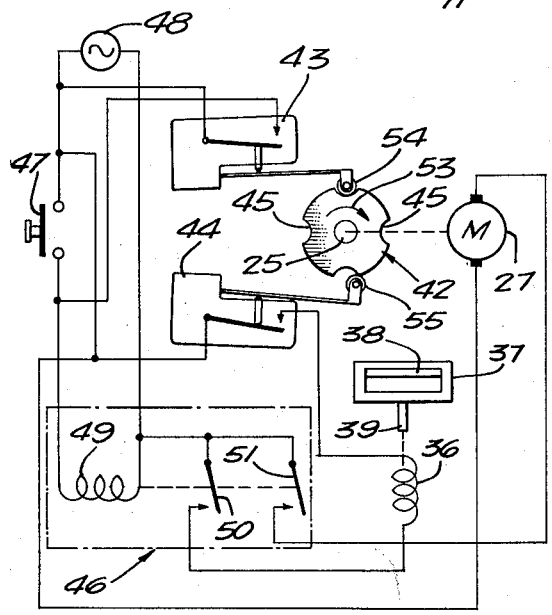
FIGURE 2 is a fragmentary sectional elevation view taken substantially on the line 2—2 as shown in FIGURE 1 and schematically illustrating the electrical control apparatus of this invention.

A timing cam 42 is mounted on the shaft 25 which supports the drum 22 and has a configuration as shown in FIGURE 2. A pair of microswitches 43 and 44 are mounted on side wall 13 and are provided with cam followers 54 and 55, respectively, for engaging the cam 42. It is to be noted that microswitch 43 is opened by its follower 54 engaging one of the four equally spaced depressions 45 in the cam 42, whereas microswitch 44 is closed by its cam follower 55 engaging one of the depressions 45. The cam followers 54 and 55 of microswitches 43 and 44, respectively, are so positioned relative to the cam 42 and each other that upon rotation of cam 42 in the direction of arrow 53 (as will be the direction of rotation during operation), the cam follower 55 of switch 44 engages a depression 45 slightly before the cam follower 54 of switch 43 engages a depression 45. A relay 46 and a start switch 47 are provided and are electrically connected to a power source 48, the microswitches 43 and 44, motor 27 and solenoid 36 as shown in FIGURE 2.

When it is desired to dispense a slice of cheese from the apparatus 10, the start switch 47 is momentarily closed to energize the coil 49 provided in relay 46 to close switches 50 and 51 of the relay 46. Closing of switch 51 starts the motor 27 to rotate the drum 22 and cam 42 in the direction of arrows 53. The movement of cam 42 from the position shown in FIGURE 2 causes the closing of switch 43 which effectively bypasses the start switch 47 to maintain the coil 49 of relay 46 energized to keep switches 50 and 51 closed. The rotation of drum 22 causes the spool 20 and cheese roll or package 16 to rotate in the direction of arrow 52, thereby causing the layer of cheese 17 to be separated by end 33 of the pallet 31 and be progressively fed down the pallet 31. When the drum 22 and cam 42 have rotated approximately 90°, a proper amount of web 18 will have been wrapped onto drum 22 to position the proper length of cheese on the pallet 31 for severing the cheese by knife blade 38 to give the desired size of cheese slice. When the cam 42 has rotated nearly 90° from the position shown in FIGURE 2, the cam follower 55 of microswitch 44 will become positioned in a depression 45, thereby closing switch 44. The closing of switch 44 energizes the coil of solenoid 36 to pull the plunger 39, knife holder 37, knife blade 38, and hold-down roll 41 downwardly to sever a piece of cheese from the continuous length of cheese as heretofore described. When the cam 42 has rotated a complete 90° from the position shown in FIGURE 2, the cam follower 54 of microswitch 43 will become positioned in a depression 45 to open switch 43. Unless the start switch 47 has been held closed to effect the continuous dispensing of cheese slices, the opening of microswitch 43 will deenergize the coil 49 of relay 46 and thereby open switches 50 and 51. The opening of switch 51 stops the rotation of motor 27 and therefore stops the further dispensing of cheese from the package 16.

It is to be noted that the follower roll 23 continually rides on top of the package and therefore the outermost convoltuion of web 18 held tightly against the cheese to keep the package 16 closed and minimize the amount of cheese which is exposed to the air at any one time.

Although we have described the use of the apparatus of our invention with a cheese roll or package containing a continuous length of cheese, it is to be understood that more than one length of cheese may be incorporated in a single roll without adversely affecting the operation of our apparatus. Moreover, the cheese roll or package may be comprised of a plurality of individual "slices" which have been positioned on the web and rolled into the roll as is shown in the drawings of the aforementioned copending application of McCadam and the apparatus of our invention will operate and function in the same manner except that the knife blade 38, knife holder 37, and solenoid 36 are not needed and may be omitted since the cheese has already been divided into the proper lengths for the desired size of slice.

Having fully described our invention it is to be understood that we do not wish to be limited to the structural details herein set forth or to the details illustrated in the drawings, but our invention is of the full scope of the appended claims.

We claim:

1. In an apparatus for dispensing slices of cheese from a length of cheese positioned on a continuous length of web and packaged in a roll, the combination of means for rotatably supporting the roll of cheese and web, a rotatably supported drum for wrapping the web on, means for rotating said drum to pull the web from the roll of cheese and web and thereby rotate the roll, a pallet having a surface for receiving the length of cheese and being movably mounted relative to the roll of cheese and web, said pallet having means for engaging the roll of cheese and web for separating the outer layer of cheese from the layer of web remaining on the roll as the roll is rotated, means for resiliently urging said pallet into engagement with the roll of cheese and web, and means for severing a portion of cheese from the length of cheese separated from the coil.

2. In an apparatus for dispensing slices of cheese from a length of cheese positioned on a continuous length of web, and packaged in a roll, the combination of means for rotatably supporting the roll of cheese and web, a rotatably supported drum for wrapping the web on, means for rotating said drum to pull the web from the roll of cheese and web and thereby rotate the roll, a pallet having a surface for receiving the length of cheese and being movably mounted relative to the roll of cheese and web, said pallet having means for engaging the roll of cheese and web for separating the outer layer of cheese from the layer of web remaining on the roll as the roll is rotated, means for resiliently urging said pallet into engagement with the roll of cheese and web, a knife movable toward said pallet for severing a portion of cheese from the continuous length of cheese, and means associated with said drum for interrupting the rotation of the drum and actuating said knife to sever said portion of cheese from the length of cheese.

3. In an apparatus for dispensing slices of cheese from a length of cheese positioned on a continuous length of web and packaged in a roll, the combination of means for rotatably supporting the roll of cheese and web, a rotatably supported drum for wrapping the web on, means for rotating said drum to pull the web from the roll of cheese and web and thereby rotate the roll, a pallet having a surface for receiving the length of cheese and being movably mounted relative to the roll of cheese and web, said pallet having means for engaging the roll of cheese and web for separating the outer layer of cheese from the layer of web remaining on the roll as the roll is rotated, a roller rotatably mounted on said pallet for separating the surface of the cheese from said surface of the pallet, means for resiliently urging said pallet into engagement with the roll of cheese and web, a knife movable toward said pallet for severing a portion of cheese from the continuous length of cheese, and means associated with said drum for interrupting the rotation of the drum and actuating said knife to sever said portion of cheese from the length of cheese.

4. In an apparatus for dispensing slices of cheese from a length of cheese positioned on a continuous length of web and packaged in a roll, the combination of means for rotatably supporting the roll of cheese and web, a rotatably supported drum for wrapping the web on, means for rotating said drum to pull the web from the roll of cheese and web and thereby rotate the roll, a follower roll rotatably and movably mounted relative to the roll of cheese and web for continually contacting the outer layer of web on the roll of cheese and web and for guiding the web from the roll to said drum, means for separating the cheese from the roll as the roll is rotated, and means for severing a portion of cheese from the length of cheese separated from the roll.

5. In an apparatus for dispensing slices of cheese from a length of cheese positioned on a continuous length of web and packaged in a roll, the combination of means for rotatably supporting the roll of cheese and web, a rotatably supported drum for wrapping the web on, means for rotating said drum to pull the web from the roll of cheese and web and thereby rotate the roll, a follower roll rotatably and movably mounted relative to the roll of cheese and web for continually contacting the outer layer of web on the roll of cheese and web and for guiding the web from the roll to said drum, a pallet having a surface for receiving the length of cheese and being movably mounted relative to the roll of cheese and web, said pallet having means for engaging the roll of cheese and web for separating the outer layer of cheese from the layer of web remaining on the roll as the roll is rotated, a roller rotatably mounted on said pallet for separating the surface of the cheese from said surface of the pallet, means for resiliently urging said pallet into engagement with the roll of cheese and web, and a knife movable toward said pallet for severing a portion of cheese from the continuous length of cheese.

6. In an apparatus for dispensing slices of cheese from a length of cheese positioned on a continuous length of web and packaged in a roll, the combination of means for rotatably supporting the roll of cheese and web, a rotatably supported drum for wrapping the web on, means for rotating said drum to pull the web from the roll of cheese and web and thereby rotate the roll, a follower roll rotatably and movably mounted relative to the roll of cheese and web for continually contacting the outer layer of web on the roll of cheese and web and for guiding the web from the roll to said drum, a pallet having a surface for receiving the length of cheese and being movably mounted relative to the roll of cheese and web, said pallet having means for engaging the roll of cheese and web for separating the outer layer of cheese from the layer of web remaining on the roll as the roll is rotated, a roller rotatably mounted on said pallet for separating the surface of the cheese from said surface of the pallet, means for resiliently urging said pallet into engagement with the roll of cheese and web, a knife movable toward said pallet for severing a portion of cheese from the continuous length of cheese, and means associated with said drum for interrupting the rotation of the drum and actuating said knife to sever said portion of cheese from the length of cheese.

7. In an apparatus for dispensing slices of cheese from a length of cheese positioned on a continuous length of web and packaged in a roll, the combination of means for rotatably supporting the roll of cheese and web, a rotatably supporting drum for wrapping the web on, means for rotating said drum to pull the web from the roll of cheese and web and thereby rotate the roll, a follower roll rotatably and movably mounted relative to the roll of cheese and web for continually contacting the outer layer of web on the roll of cheese and web and for guiding the web from the roll to said drum, a pallet having a surface for receiving the length of cheese and being movably mounted relative to the roll of cheese and web, said pallet having means for engaging the roll of cheese and web for separating the outer layer of cheese from the layer of web remaining on the roll as the roll is rotated, a roller rotatably mounted on said pallet for separating the surface of the cheese from said surface of the pallet, means for resiliently urging said pallet into engagement with the roll of cheese and web, a knife movable toward said pallet for severing a portion of cheese from the continuous length of cheese, and means resiliently associated with said knife for holding the cheese against the said surface of pallet as said knife moves toward and away from said pallet.

8. In an apparatus for dispensing slices of cheese from a length of cheese positioned on a continuous length of web and packaged in a roll, the combination of means for rotatably supporting the roll of cheese and web, a rotatably supported drum for wrapping the web on, means for rotating said drum to pull the web from the roll of cheese and web and thereby rotate the roll, a follower roller rotatably and movably mounted relative to the roll of cheese and web for continually contacting the outer layer of web on the roll of cheese and web and for guiding the web from the roll to said drum, a pallet having a surface for receiving the length of cheese and being movably mounted relative to the roll of cheese and web, said pallet having means for engaging the roll of cheese and web for separating the outer layer of cheese from the layer of web remaining on the roll as the roll is rotated, a roller rotatably mounted on said pallet for separating the surface of the cheese from said surface of the pallet, means for resiliently urging said pallet into engagement with the roll of cheese and web, a knife movable toward said pallet for severing a portion of cheese from the continuous length of cheese, means resiliently associated with said knife for holding the cheese against the said surface of pallet as said knife moves toward and away from said pallet, and means associated with said drum for interrupting the rotation of the drum and actuating said knife to sever said portion of cheese from the length of cheese.

9. In an apparatus for dispensing slices of cheese from a length of cheese positioned on a continuous length of web and packaged in a roll, the combination of means for rotatably supporting the roll of cheese and web, a rotatably supported drum for wrapping the web on, means for rotating said drum to pull the web from the roll of cheese and web and thereby rotate the roll, a pallet having a surface for receiving the length of cheese and being movably mounted relative to the roll of cheese and web, said pallet having means for engaging the roll of cheese and web for separating the outer layer of cheese from the layer of web remaining on the roll as the roll is rotated, and means for resiliently urging said pallet into engagement with the roll of cheese and web.

References Cited by the Examiner
UNITED STATES PATENTS

| | | | |
|---|---|---|---|
| 2,313,125 | 3/43 | Czapek. | |
| 2,352,210 | 6/44 | Kraft | 31—46 |
| 2,743,064 | 4/56 | LeFebvre et al. | 156—344 |
| 2,925,269 | 2/60 | Hensger et al. | 31—89 |

SAMUEL KOREN, *Primary Examiner.*

CARL W. ROBINSON, HUGH R. CHAMBLEE, *Examiners.*